United States Patent [19]
Takahashi et al.

[11] Patent Number: 5,258,680
[45] Date of Patent: Nov. 2, 1993

[54] ARMATURE WINDING STRUCTURE FOR ELECTRIC MOTORS

[75] Inventors: Tadanobu Takahashi; Hiroshi Gomi; Masato Hirose; Masao Nishikawa; Masaru Ozawa; Takashi Hotta, all of Wako, Japan

[73] Assignee: Honda Giken Kogyo Kabushiki Kaisha, Tokyo, Japan

[21] Appl. No.: 897,106

[22] Filed: Jun. 11, 1992

[30] Foreign Application Priority Data

Jun. 17, 1991 [JP] Japan .................... 3-144905

[51] Int. Cl.$^5$ .............................. H02K 3/14
[52] U.S. Cl. ......................... 310/213; 174/34; 336/187
[58] Field of Search ............ 310/213, 186, 206; 174/34; 336/187

[56] References Cited

U.S. PATENT DOCUMENTS

| | | | |
|---|---|---|---|
| 2,896,102 | 7/1959 | Bucklew | 310/213 |
| 3,805,104 | 4/1974 | Margrain et al. | |
| 3,821,574 | 6/1974 | Ruelle | 310/213 |
| 3,976,904 | 8/1976 | Leistner | 310/213 |
| 4,191,903 | 3/1980 | Brenner | 310/213 |
| 4,307,313 | 12/1981 | Rohrer | 310/213 |
| 4,381,467 | 4/1983 | Grunewald | 310/213 |
| 4,384,277 | 5/1983 | Kawai | 310/213 |
| 4,703,211 | 10/1987 | Yazaki | 310/156 |
| 4,900,961 | 2/1990 | Kudo | 310/156 |
| 4,954,739 | 9/1990 | Schultz | 310/156 |

FOREIGN PATENT DOCUMENTS

| | | | |
|---|---|---|---|
| 1134454 | 8/1962 | Fed. Rep. of Germany | 310/213 |
| 3546512 | 7/1987 | Fed. Rep. of Germany | |
| 457415 | 9/1913 | France | |
| 63-28239 | 7/1988 | Japan | |
| 0071773 | 2/1916 | Switzerland | 310/213 |
| 1032345 | 11/1961 | United Kingdom | |
| 1545777 | 5/1979 | United Kingdom | |

*Primary Examiner*—R. Skudy
*Attorney, Agent, or Firm*—Birch, Stewart, Kolasch & Birch

[57] ABSTRACT

An armature winding structure for use in an electric motor includes a web-shaped strand bundle composed of a plurality of parallel strands. The strand bundle has a plurality of longitudinally spaced bends and a plurality of straight strand bundle segments. Adjacent ones of the strand bundle segments are positioned one on each side of one of the bends. The strand bundle segments are transversely staggered on one side of the strand bundle successively from one end to the other of the strand bundle, by intervals each substantially equal to the width of the strand bundle. The strand bundle segments thus staggered are longitudinally folded over along fold lines extending respectively across or near the bends transversely of the strand bundle, thereby providing a plate-like winding in which the strand bundle segments lie adjacent to one another.

11 Claims, 13 Drawing Sheets

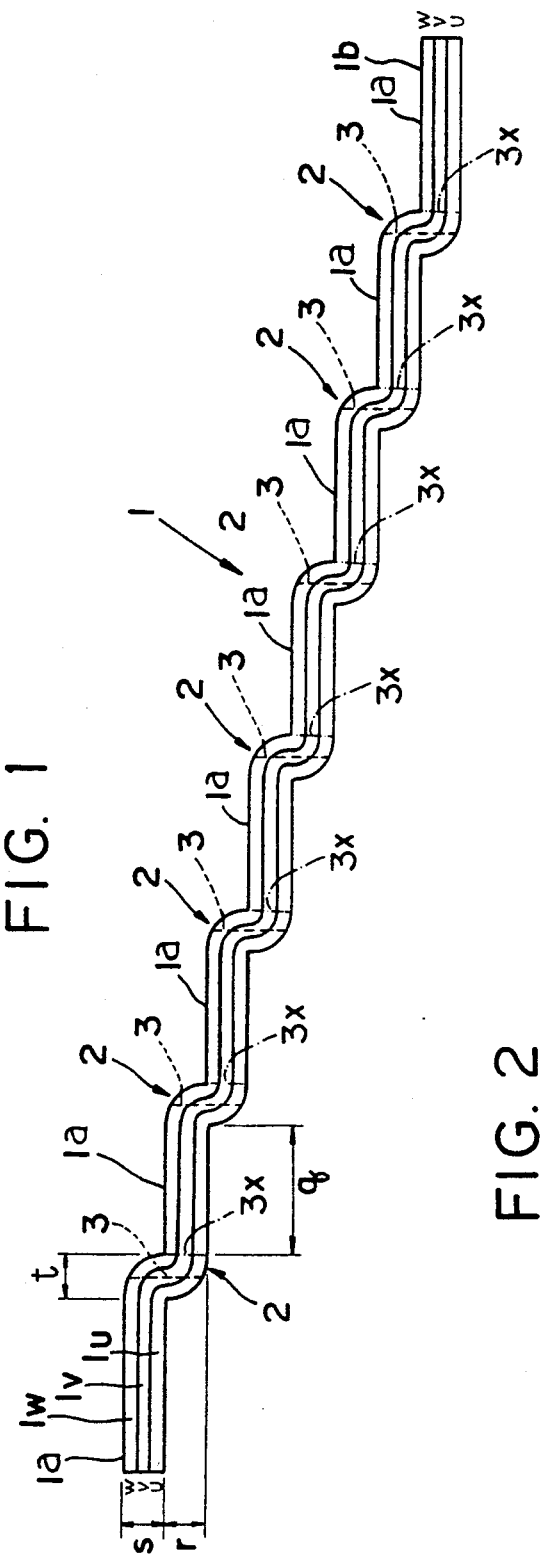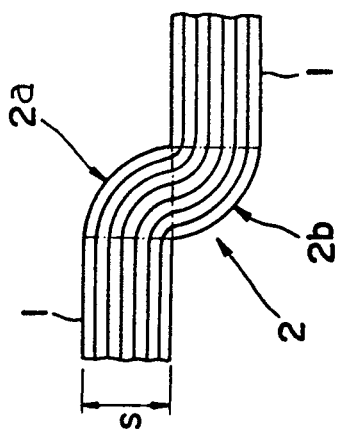

ARMATURE WINDING STRUCTURE FOR ELECTRIC MOTORS

BACKGROUND OF THE INVENTION

1. Field of the Invention

The present invention relates to an armature winding structure for use in an electric motor.

2. Description of the Prior Art

One conventional winding structure for use on the armature of an electric motor is shown in FIG. 22 of the accompanying drawings.

The winding structure comprises a winding D generally known as a helical winding. The winding D is composed of three parallel web-shaped strand bundles 50, 51, 52 each comprising a plurality of parallel strands, the strand bundles 50, 51, 52 being allotted respectively to U-, V-, and W-phase currents. The strand bundles 50, 51, 52 are folded over on themselves at certain intervals into a flat configuration. The folded flat winding structure has a plurality of folded edges 53, 54 on its opposite sides and a plurality of straight conducting regions 55, extending between the folded edges 53, 54, where currents flow in a straight direction. These straight conducting regions 55 are disposed adjacent to one another, and jointly make up a flat strand plate 56 in which the strand bundles 50, 51, 52 extend transversely. Since the winding D can easily be manufactured, it is widely used as armature windings.

In the U-phase, however, the folded strand bundle 50 overlaps itself in each of folds e at the folded edges 53, 54. The overlapping strand bundle 50 causes the current to flow in opposite directions through the face and back areas of each fold e. Since the magnetic fields generated by the current flowing in the opposite directions cancel out each other in each fold e, the winding D brings about a loss when used as a motor armature winding. In view of the fact that the currents of one set of phases, such as V- and W-phases, among the U-, V-, and W-phases, flow in one direction, the strand bundles 51, 52 for the V- and W-phases as well as the strand bundle 50 for the U-phase also overlap themselves at the folded edges 53, 54, as shown hatched in FIG. 22. The overlapping regions of these strand bundles 50, 51, 52 total 33 through 56% of the entire area of the flat strand plate 56. Therefore, the winding D is responsible for a very large torque loss.

With the overlapping strand bundles 50, 51, 52, the winding D as it is incorporated in an electric motor requires a relatively large number of strands in order to produce a desired torque. Therefore, the winding D is relatively heavy, and so is the electric motor. In the electric motor, the winding D is positioned between a core and a rotor. Inasmuch as the winding D is rendered thick by the overlapping strand bundles 50, 51, 52, the core and the rotor are spaced from each other by a large distance, and the flux density between the core and the rotor is relatively low, also resulting in a torque loss.

Furthermore, the directions in which the currents flow through the strand bundles 50, 51, 52 extend obliquely to the axis of the electric motor. Consequently, the magnetic field generated by the winding D and the magnetic field generated by a magnet (not shown) have different directions. As a consequence, the electric motor produces electromagnetic forces with low efficiency, causing a torque loss.

SUMMARY OF THE INVENTION

In view of the foregoing drawbacks of the conventional armature winding structure, it is an object of the present invention to provide an armature winding structure for use in an electric motor, which can easily be manufactured, is able to produce a desired torque when incorporated in the electric motor, and is light in weight and small in size.

To achieve the above object, there is provided in accordance with a first aspect of the present invention an armature winding structure for use in an electric motor, comprising a web-shaped strand bundle composed of a plurality of parallel strands, the strand bundle having a plurality of longitudinally spaced bends and a plurality of straight strand bundle, segments, adjacent strand bundle segments being positioned one on each side of one of the bends, the strand bundle segments being transversely staggered on one side of the strand bundle successively from one end to the other of the strand bundle, by intervals each substantially equal to the width of the strand bundle, the strand bundle being longitudinally folded over along fold lines extending respectively across or near the bends transversely of the strand bundle, thereby providing a plate-like winding in which the strand bundle segments lie adjacent to one another.

Overlapping regions of the strand bundle are positioned only in the vicinity of the fold lines and have a relatively small area. Almost no regions of the strand bundle segments themselves overlap each other. Therefore, the winding is effective to produce a magnetic field necessary to rotate the electric motor.

The strand bundle segments extend parallel to each other before the strand bundle is folded over. Preferably, each of the bends has a pair of opposite arcuate edges extending along the respective arcs of a pair of quadrants whose radii are the same as the width of the strand bundle and whose centers are spaced from each other by the width of the strand bundle. The bends can easily be formed, and occupy a relatively small area in the strand bundle. The overlapping regions of the strand bundle are minimized.

In the case where the strand bundle segments extend parallel to each other before the strand bundle is folded over, the fold lines preferably extend substantially perpendicularly to the longitudinal direction of the strand bundle, and are positioned centrally in the bends, respectively, in the longitudinal direction of the strand bundle. More preferably, the bends have equal lengths in the longitudinal direction of the strand bundle, and the strand bundle segments between the bends have equal lengths in the longitudinal direction of the strand bundle. Such an arrangement makes it possible to fold over the strand bundle with ease. The overlapping regions of the strand bundle are positioned only at the bends, preventing the strand bundle segments from overlapping each other and also allowing them to lie parallel to each other. The winding structure is further effective in producing a magnetic field necessary to rotate the electric motor.

Preferably, the strand bundle which is longitudinally folded over has portions extending between the fold lines, the portions having equal lengths. The armature winding structure is thus made compact, and magnetic fields produced by those portions between the fold lines are uniformly standardized for efficiently rotating the electric motor.

When the armature winding structure is incorporated in the electric motor, the strand bundle which is longitudinally folded over has overlapping regions near the fold lines, respectively, the overlapping regions being positioned axially outwardly of a core of an armature of the electric motor, so that the magnetic fields produced by the overlapping regions will not affect the operation of the motor. Alternatively, the strand bundle which is longitudinally folded over has portions extending between the fold lines, the portions having lengths equal to the length of the core or a magnet of the electric motor, so that the magnetic fields produced by the overlapping regions will be employed to rotate the electric motor.

Before the strand bundle is folded over, odd-numbered ones of the strand bundle segments as counted from a reference strand bundle segment at one end of the strand bundle may extend parallel to each other, and even-numbered ones of the strand bundle segments as counted from the reference strand bundle segment may extend parallel to each other and obliquely to the odd-numbered strand bundle segments, the fold lines being positioned such that the strand bundle segments lie parallel to each other after the strand bundle is folded over.

Alternatively, before the strand bundle is folded over, odd-numbered ones of the strand bundle segments as counted from a reference strand bundle segment at one end of the strand bundle may extend parallel to each other, and even-numbered ones of the strand bundle segments as counted from the reference strand bundle segment may extend parallel to each other, the fold lines being positioned such that adjacent ones of the strand bundle segments are inclined at an angle to each other after the strand bundle is folded over. With the strand bundle segments being inclined to each other, the magnetic field produced by the winding and the magnetic field produced by the magnet of the motor are oriented in different directions with a suitable angle therebetween, resulting in a skew effect for smooth motor rotation.

Each of the bends may be formed when the strand bundle segments positioned one on each side thereof are displaced relatively to each other in substantially transverse opposite directions, respectively. Alternatively, each of the bends may be formed when the strand bundle segments positioned one on each side thereof are folded over in substantially perpendicular directions, providing an overlapping region thereof, and then one of the strand bundle segments is folded over in a direction substantially parallel to the other of the strand bundle segments outside of the overlapping region.

According to a second aspect of the present invention, there is also provided an armature winding structure for use in an electric motor, comprising a web-shaped strand bundle composed of a plurality of parallel strands, the strand bundle having a plurality of longitudinally spaced bends and a plurality of straight strand bundle segments, adjacent two of the strand bundle segments being positioned one on each side of one of the bends, the strand bundle segments being transversely staggered on one side of the strand bundle such that odd-numbered ones of the strand bundle segments as counted from a reference strand bundle segment at one end of the strand bundle are staggered from the strand bundle by different intervals which are equal to multiples of the width of the strand bundle by respective odd numbers, and that even-numbered ones of the strand bundle segments as counted from the reference strand bundle segment are staggered from the strand bundle by different intervals which are equal to multiples of the width of the strand bundle by respective even numbers, the strand bundle being longitudinally folded over along folds extending respectively across or near the bends transversely of the strand bundle, thereby providing a plate-like winding in which the strand bundle segments lie adjacent to one another. In this arrangement, overlapping regions of the strand bundle are positioned only in the vicinity of the fold lines and have a relatively small area. Almost no regions of the strand bundle segments themselves overlap each other. Therefore, the winding is effective to produce a magnetic field necessary to rotate the electric motor. The additional features, as described above, of the armature winding structure according to the first aspect of the present invention may also be added to the armature winding structure according to the second aspect of the present invention.

The armature winding structure according to the second aspect of the invention is equivalent to the armature winding structure according to the first aspect of the invention in that the intervals by which the strand bundle segments are transversely staggered from the reference strand bundle segment are equal to the products of the width of the strand bundle and the counts of the strand bundle segments from the reference strand bundle.

According to a third aspect of the present invention, there is provided an armature winding structure for use in an electric motor, comprising a web-shaped strand bundle composed of a plurality of parallel strands, the strand bundle having a plurality of longitudinally spaced bends and a plurality of straight strand bundle segments, adjacent strand bundle, segments being positioned one on each side of one of the bends, the strand bundle segments being transversely staggered on one side of the strand bundle successively from one end to the other of the strand bundle, the strand bundle being longitudinally folded over at the bends obliquely to the longitudinal direction of the strand bundle, thereby providing a plate-like winding in which the strand bundle segments lie adjacent to one another and extend obliquely to each other in a successively overlapping relationship.

Since adjacent strand bundle segments are transversely staggered at the bend therebetween, any overlapping regions of the strand segments have a smaller area than the conventional helical winding structure. The strand bundle segments are capable of effectively producing magnetic fields.

Preferably, before the strand bundle is folded over, the strand bundle segments lie parallel to each other and spaced at substantially equal intervals transversely of the strand bundle, the strand bundle being folded over along fold lines at the respective bends, the fold lines being inclined at an angle to the transverse direction of the strand bundle. This structure permits the armature winding to be manufactured easily.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 1 is a plan view of a winding, shown unfolded, according to a first embodiment of the present invention;

FIG. 2 is an enlarged fragmentary plan view of the winding shown in FIG. 1;

DETAILED DESCRIPTION OF THE PREFERRED EMBODIMENTS

Figure 3:
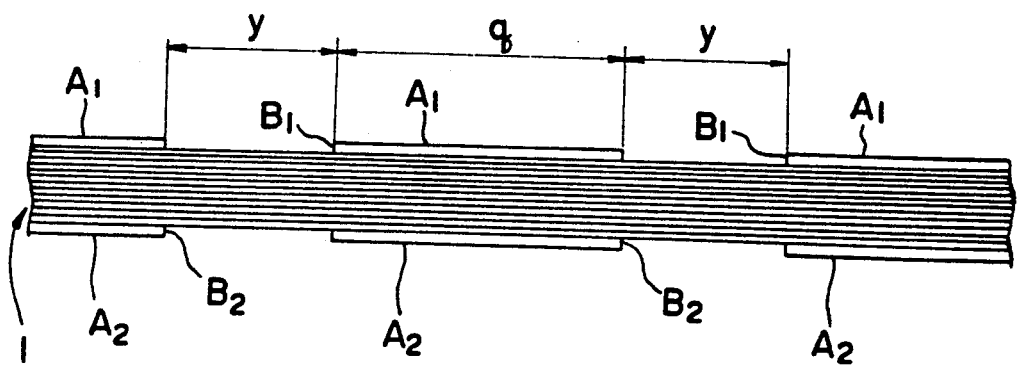
FIGS. 3 and 4 are fragmentary plan views showing a process of manufacturing the winding shown in FIG. 1.

FIGS. 1 through 7 show a winding according a first embodiment of the present invention.

In FIG. 1, the winding, shown unfolded, comprises a unitary strand bundle 1 composed of three parallel web-shaped strand bundles $1_u$, $1_v$, $1_w$ each comprising a plurality of parallel strands, the strand bundles $1_u$, $1_v$, $1_w$ being allotted respectively to U-, V-, and W-phase currents. The unitary strand bundle 1 includes a plurality of (seven in this embodiment) bends 2 longitudinally spaced at predetermined intervals q. The unitary strand bundles 1 is divided into a plurality of straight strand bundle segments 1a by the bends 2, each bend 2 being disposed between two of the strand bundle segments 1a. The strand bundle segments 1a are successively staggered transversely on one side of the strand bundle 1 from one end to the other of the strand bundle 1, and extend parallel to each other. The unitary strand bundle 1 has a width s.

Any adjacent two of the strand bundle segments 1a are transversely staggered relative to each other by an interval r that is the same as the width s of the unitary strand bundle 1. Each of the bends 2 has a length t that is the same as the width s. As shown in FIG. 2 at an enlarged scale, each of the bends 2 has opposite arcuate edges extending along the respective arcs of quadrants 2a, 2b whose radii are the same as the width s and whose centers are spaced from each other by the width s. Each bend 2 and adjoining portions of the two strand bundle segments 1a are substantially S-shaped. As shown in FIG. 1, a fold line 3 extending perpendicularly to the longitudinal direction of the strand bundle 1 lies centrally across each bend 2.

The strand bundle 1 with the bends 2 is manufactured as follows: As shown in FIG. 3, before the strand bundle 1 is bent into the staggered shape, a plurality of sets of jigs $A_1$, $A_2$ are positioned at certain spaced intervals y longitudinally along the strand bundle 1. The jigs $A_1$, $A_2$ in each set grip the portion of the strand bundle 1 which corresponds to one of the strand bundle segments 1a, and have a length which is the same as the interval q, i.e., the length of each strand bundle segment 1a between two bends 2. The distance y between two adjacent sets of the jigs $A_1$, $A_2$ is ½ of the circumferential dimension of a circle whose diameter is the same as the width s.

Figure 4:
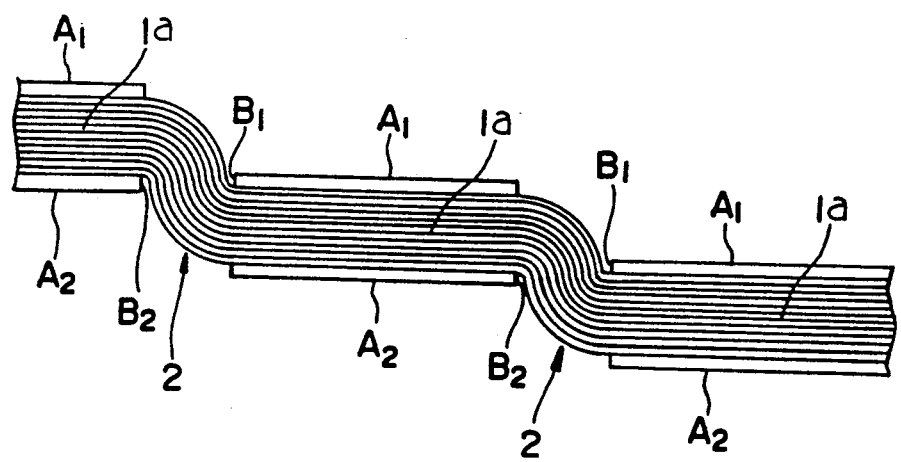

While the opposite sides of the strand bundle 1 are being gripped by the jigs $A_1$, $A_2$, the sets of the jigs $A_1$, $A_2$, except the one at the lefthand end of the strand bundle 1, are displaced substantially transversely of the strand bundle 1 and at the same time are pressed toward each other in the longitudinal direction of the strand bundle 1, as shown in FIG. 4. The portions of the strand bundle 1 between the sets of the jigs $A_1$, $A_2$ are arcuately bent about ends $B_1$, $B_2$ of the jigs $A_1$, $A_2$ into the respective bends 2.

Figure 5:
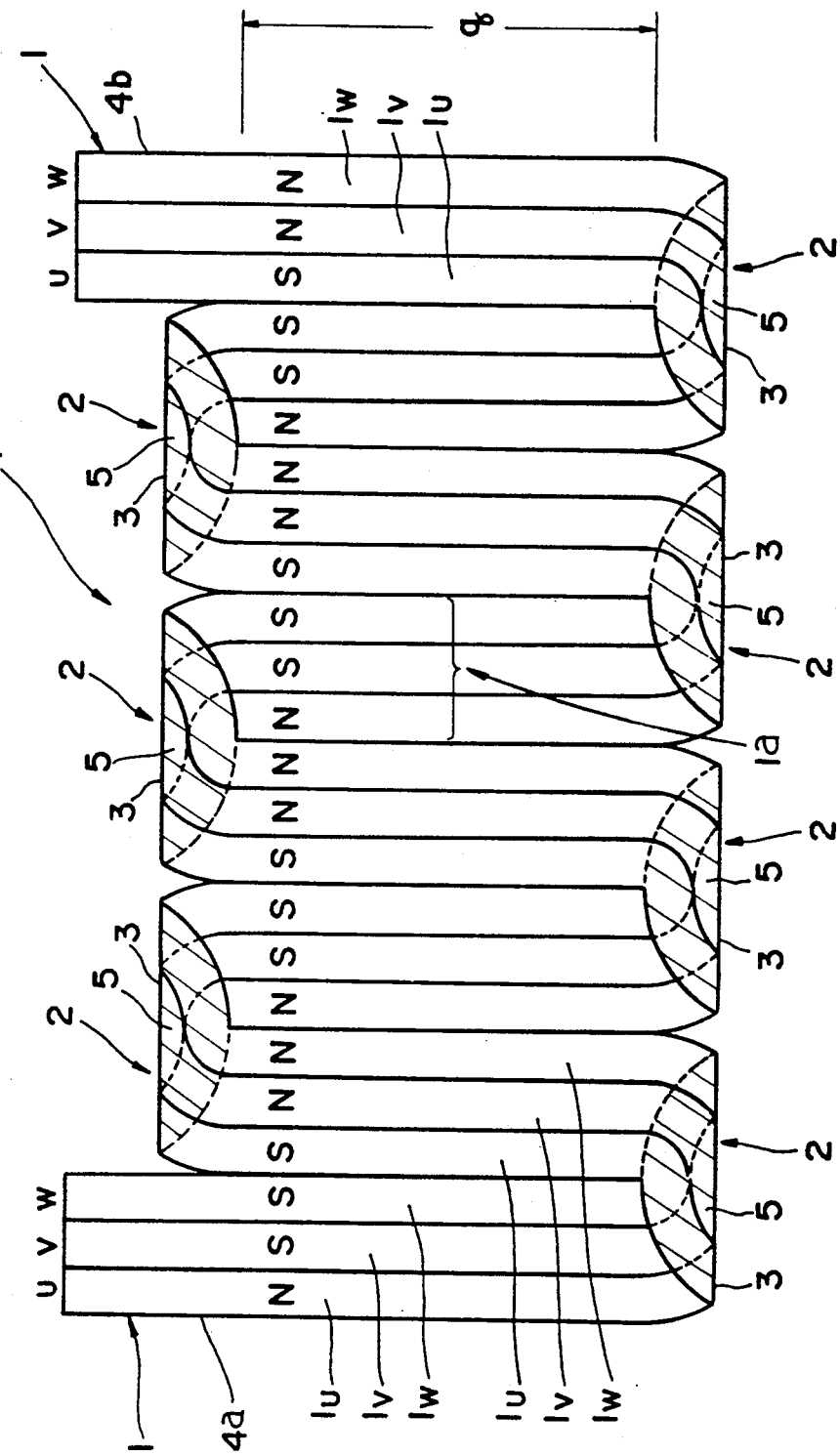
FIG. 5 is an enlarged plan view of the winding shown in FIG. 1, as it is assembled.

The strand bundle 1 thus staggered is then folded over on itself successively along the fold lines 3 so that the strand bundle segments 1a lie parallel and adjacent to each other, jointly making up a flat plate-shaped winding 4 as shown in FIG. 5. The winding 4 is of an elongate shape extending transversely of the strand bundles $1_u$, $1_v$, $1_w$, which remain unchanged in the order in which they are arranged in the winding 4. The folded strand bundle 1 overlaps itself only in the bends 2 which are folded over on themselves along the fold lines 3, resulting in overlapping regions 5 which are shown hatched in FIG. 5. In the other areas of the strand bundle 1 than the overlapping regions 5, the strand bundles $1_u$, $1_v$, $1_w$ are positioned adjacent to one another without overlapping. The strand bundles $1_u$, $1_v$, $1_w$ have portions of equal length between the fold lines 3.

Figure 22:
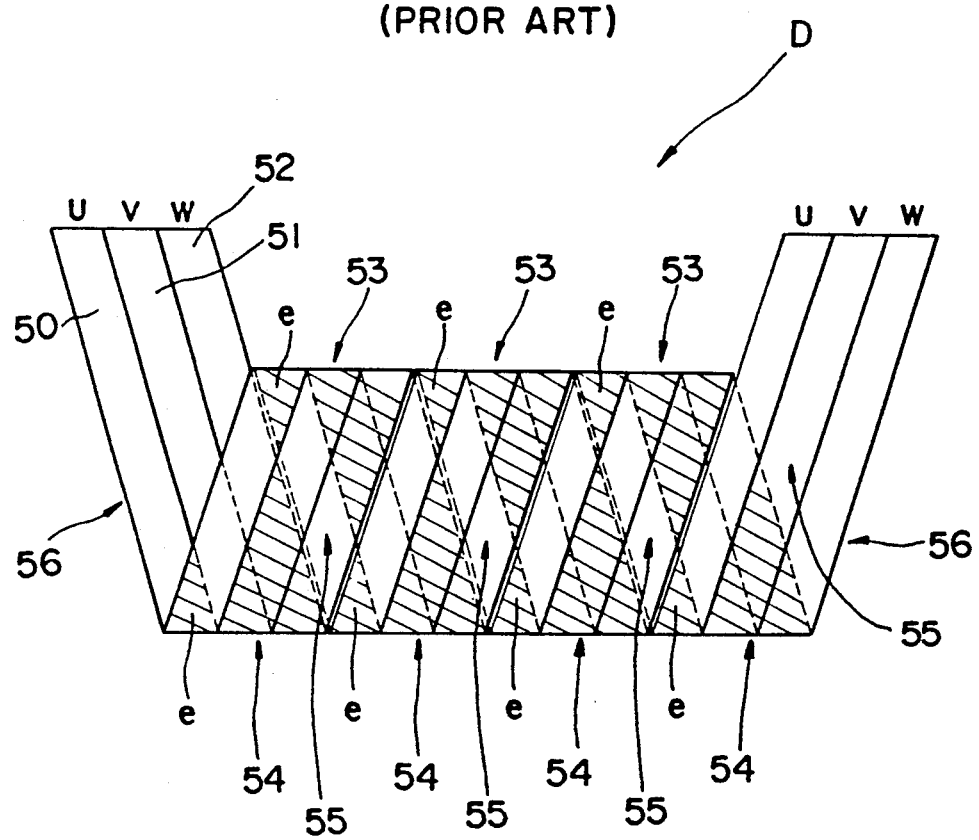
FIG. 22 is a plan view of a conventional winding.

The overlapping regions 5 of the winding 4 are smaller in area than the overlapping regions of the strand bundles of the conventional helical winding shown in FIG. 22. Consequently, the amount of material of the winding 4 is reduced, and so is the electric resistance of the winding 4 to electric currents flowing therethrough. The winding 4 is also reduced in thickness and hence weight.

When an electric current flows in one direction through the U-phase strand bundle $1_u$, and electric currents flow in an opposite direction through the V- and W-phase strand bundles $1_v$, $1_w$, the magnetic fields generated by the respective strand bundles $1_u$, $1_v$, $1_w$ are directed as shown in FIG. 5. More specifically, because the strand bundles $1_u$, $1_v$, $1_w$ are bent over successively in opposite directions, the magnetic fields generated thereby are directed in successively opposite directions, providing a regularly arranged array of N- and S-poles, i.e., alternate sets of three N-poles and three S-poles, along the winding 4. Inasmuch as the portions of the strand bundles $1_u$, $1_v$, $1_w$ between the fold lines 3 are of equal length and extend parallel to each other , and the overlapping regions 5 are of a small area, uniform magnetic fields can efficiently be generated by the strand bundle segments 1a.

Figure 6:
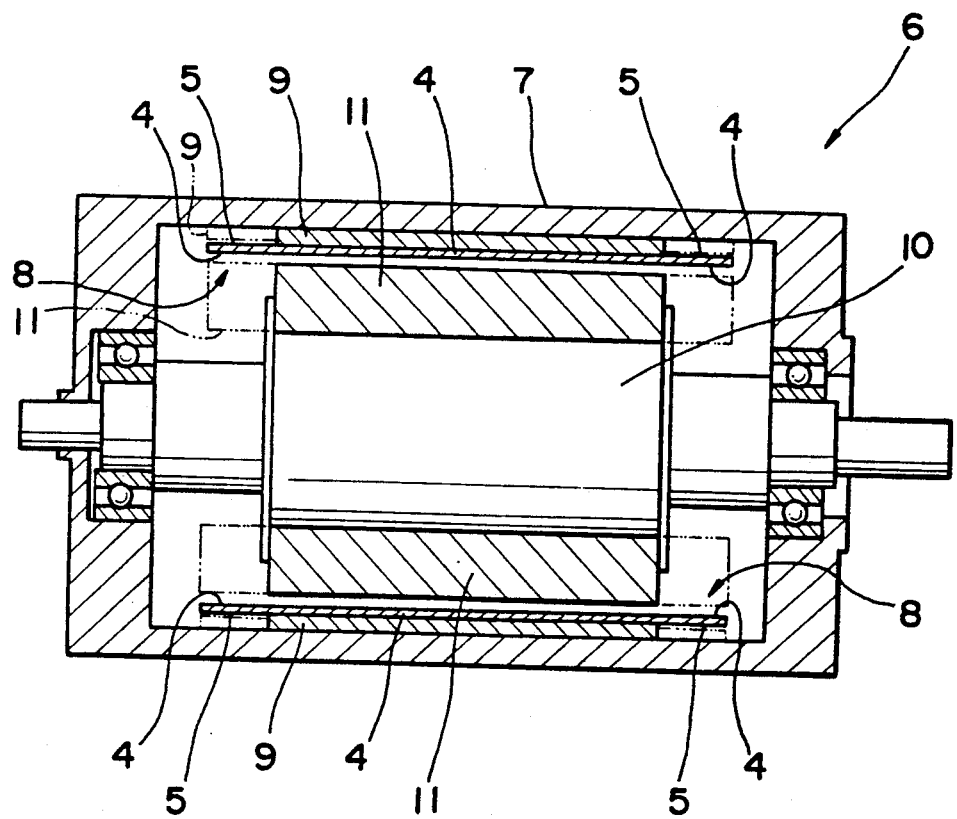
FIG. 6 is a cross-sectional view of an electric motor which incorporates the winding shown in FIG. 1.

The winding 4 is assembled in an electric motor as follows: The winding 4 is curved into a tubular form with opposite edges 4a, 4b (FIG. 5) held against each other. Then, as shown in FIG. 6, the tubular winding 4 is placed against the inner surface of a tubular core 9 of an armature 8 on a housing 7 of the stator of an electric motor 6 in a radially spaced relationship to a magnet 11 of a rotor 10. The overlapping regions 5 of the winding 4 are positioned axially outwardly of the core 9. Since the overlapping regions 5 are not radially placed on the core 9, the distance from the inner surface of the core 9 to the radially outer surface of the magnet 11 is minimized. As a consequence, the flux density in the gap between the core 9 and the magnet 11 is relatively large. The relatively large flux density and the uniform magnetic fields produced by the strand bundle segments 1a are effective to produce a desired motor torque efficiently.

Figure 7:
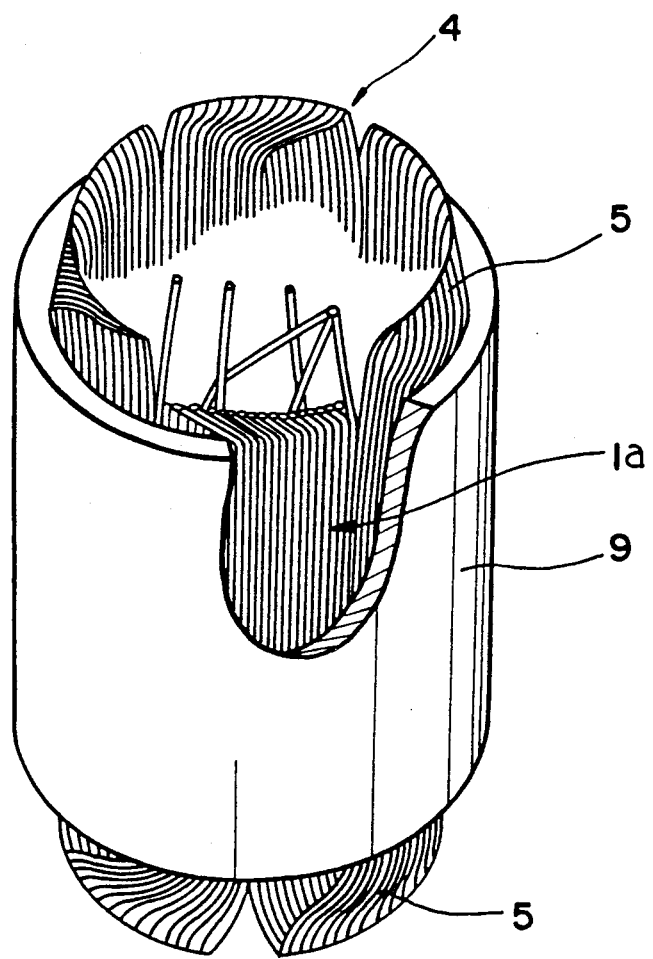
FIG. 7 is a perspective view, partly broken away, of the winding shown in FIG. 1, as it is placed in a motor core.

As shown in FIG. 7, the strand bundle segments 1a disposed in the tubular core 9 extend parallel to each other in the axial direction of the stator without overlapping each other. Accordingly, the magnetic field produced by the winding 4 and the magnetic field produced by the magnet 11 are oriented in the same direction for efficient generation of a motor torque.

As indicated by the imaginary lines in FIG. 6, either the length of the magnet 11 or the length of the core 9 may be equalized to the axial length of the winding 4 including the overlapping regions 5, so that the overlapping regions 5 may be positioned axially outwardly of the magnet 11 or the core 9 for effectively utilizing magnetic fields produced by non-overlapping portions of the strand bundle 1 that are located in the vicinity of opposite sides of the overlapping regions 5, for increased motor efficiency.

In the above first embodiment, the fold lines 3 are positioned centrally across the respective bends 2 of the strand bundles 1. However, as shown in FIG. 1, fold lines 3x may be positioned on respective strand bundle segments 1a near the respective bends 2. Overlapping regions which are formed when the strand bundle 1 is folded over on itself along the fold lines 3x are also relatively small in area. The resultant winding also has parallel strand bundles 1a for generating magnetic fields efficiently with a relatively small loss.

Figure 8:
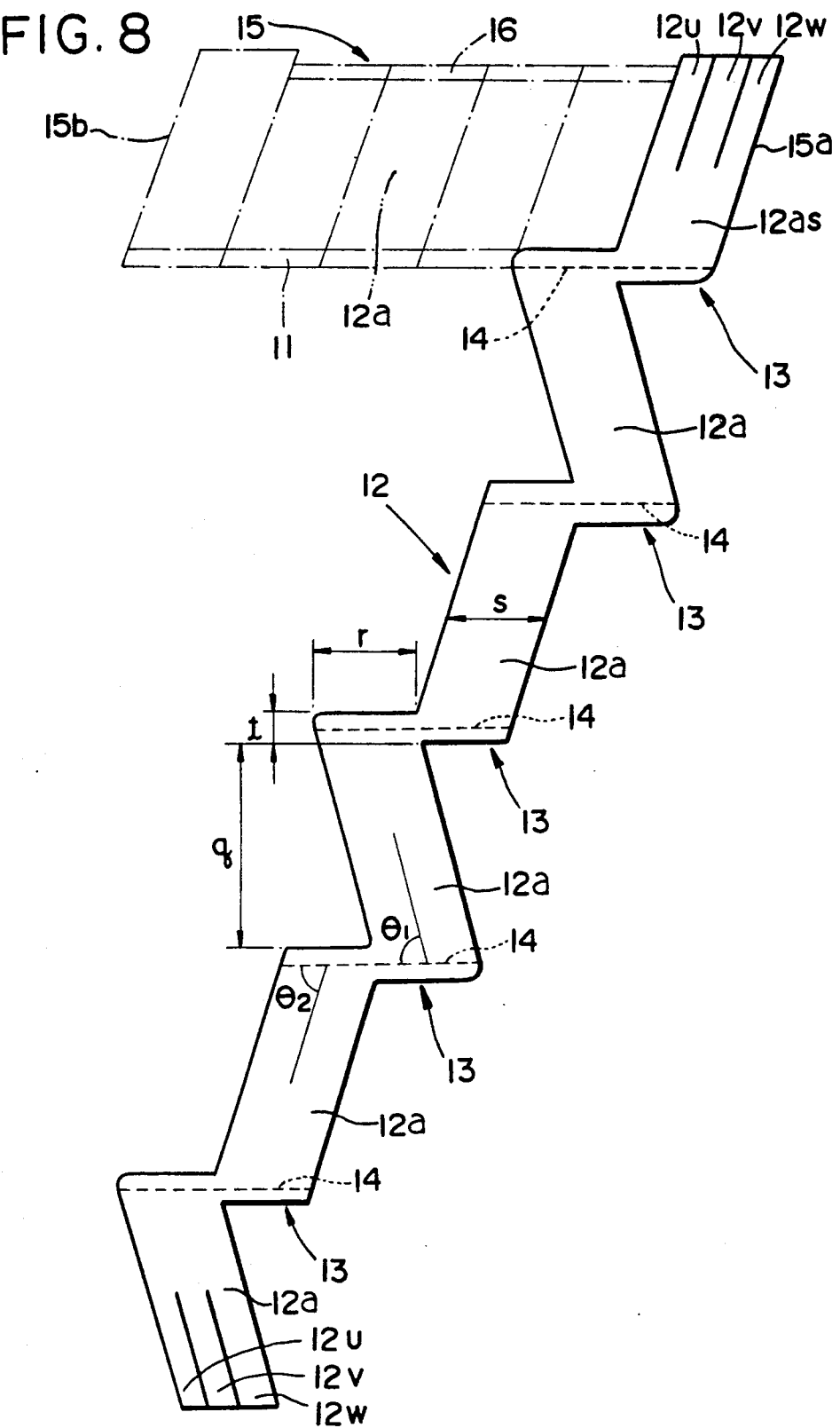
FIG. 8 is a plan view of a winding, shown unfolded, according to a second embodiment of the present invention.

FIG. 8 shows a winding according to a second embodiment of the present invention.

As shown in FIG. 8, a unitary strand bundle 12 comprises parallel strand bundles $12_u$, $12_v$, $12_z$ assigned respectively to U-, V-, and W-phases, and has a plurality of longitudinally spaced bends 13. The strand bundle 12 also has a plurality of strand bundle segments 12a each positioned one on each side of one of the bends 13. The strand bundle segments 12a are successively staggered transversely on one side of the strand bundle 12 from one end to the other of the strand bundle 12, and adjacent ones of the strand bundle segments 12a extend obliquely to each other. More specifically, odd-numbered strand bundle segments 12a as counted from a reference strand bundle segment 12as on one end of the strand bundle 12 are oriented parallel to each other, and even-numbered strand bundle segments 12a including the reference strand bundle segment 12as are oriented parallel to each other and obliquely to the odd-numbered strand bundle segments 12a.

The strand bundle segments 12a between the bends 13 have equal lengths q, and the bends 13 have equal lengths t. The strand bundle segments 12a positioned one on each side of each of the bends 13 are transversely staggered by an interval r which is the same as the width s of the strand bundle 12.

The strand bundle 12 has a plurality of transverse fold lines 14 extending centrally across the respective bends 13. Angles $\theta_1$ formed between the fold lines 14 and the odd-numbered strand bundle segments 12a and angles $\theta_2$ formed between the fold lines 14 and the even-numbered strand bundle segments 12a are equal to each other.

The strand bundle 12 is folded over on itself successively along the fold lines 14 in the longitudinal direction of the strand bundle 12, forming a plate-like winding 15 indicated by the imaginary lines. In the winding 15, the strand bundle segments 12a lie adjacent to one another in their transverse direction and extend parallel to each other. The folded strand bundle 12 overlaps itself in overlapping regions 16 which are positioned only in the respective bends 13. Accordingly, the winding 15 is effective to produce uniform magnetic fields efficiently for rotating an electric motor.

For assembling the winding 15 in an electric motor, the winding 15 is curved into a tubular form with opposite edges 15a, 15b abutting against each other. The strand bundle segments 12a are inclined at an angle to the axis of the tubular winding 15.

Figure 9:
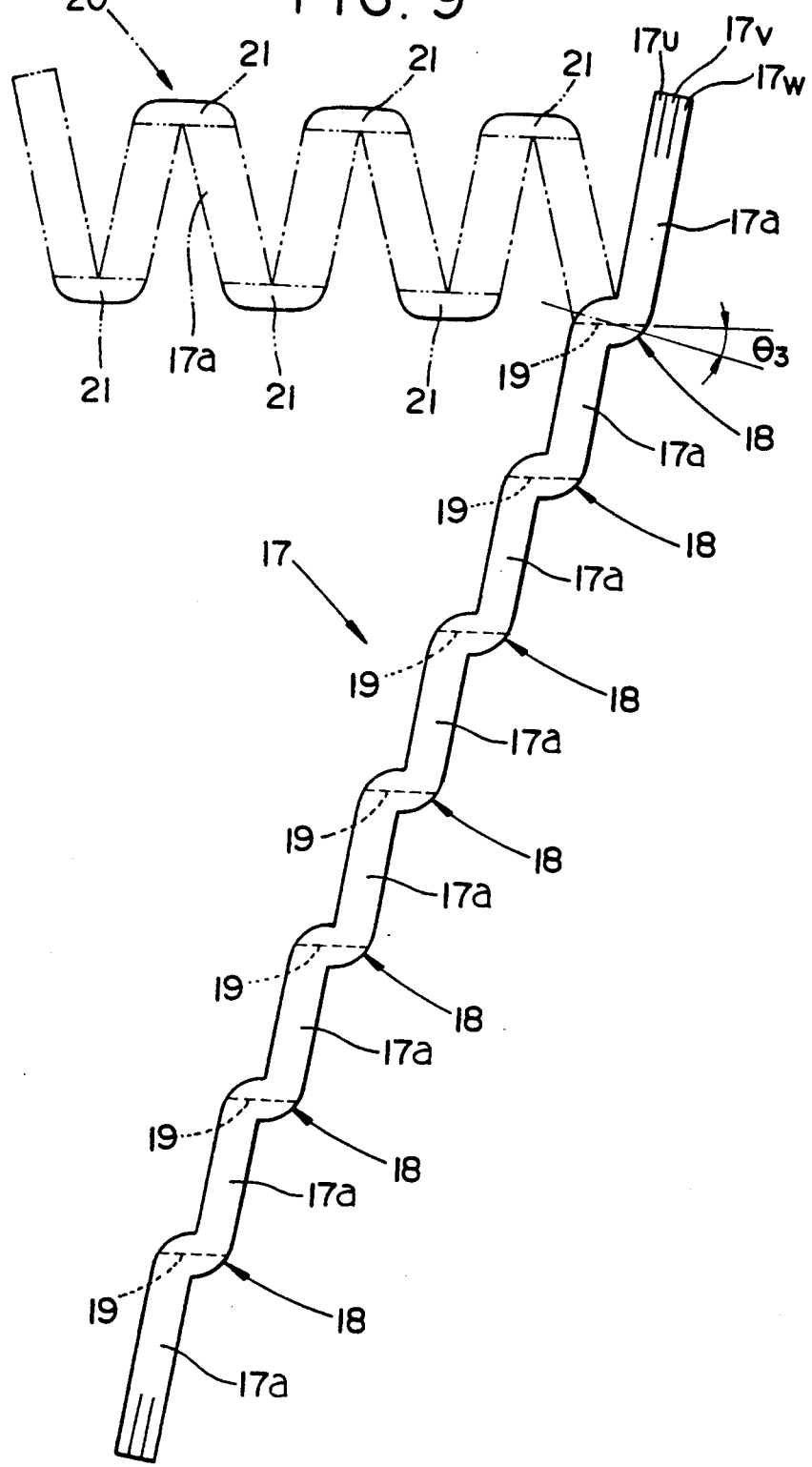
FIG. 9 is a plan view of a winding, shown unfolded, according to a third embodiment of the present invention.

FIG. 9 shows a winding according to a third embodiment of the present invention.

As shown in FIG. 9, a unitary strand bundle 17 comprises parallel strand bundles $17_u$, $17_v$, $17_w$ assigned respectively to U-, V-, and W-phases, and has a plurality of longitudinally spaced bends 18. The strand bundle 17 also has a plurality of strand bundle segments 17a adjacent two of which are positioned one on each side of one of the bends 18. The strand bundle segments 17a are successively staggered transversely on one side of the strand bundle 17 from one end to the other of the strand bundle 17, and extend parallel to each other. The shape of and the distance between the bends 18 and the length of the strand bundle segments 17a are the same as those of the bends 2 and the strand bundle segments 1a according to the first embodiment.

The strand bundle 17 has a plurality of transverse fold lines 19 extending centrally across the respective bends 18, the fold lines 19 being inclined at an angle $\theta_3$ to the transverse direction of the strand bundle 17. The strand bundle 17 is folded over on itself successively along the fold lines 19, thus forming a plate-like winding 20 as indicated by the imaginary lines in FIG. 9.

In the winding 20, adjacent ones of the strand bundle segments 17a are angularly spaced from each other by the angle $\theta_3$ without overlapping each other, with overlapping regions 21 present only at the respective fold lines 18.

Since the strand bundle segments 17a do not overlap each other and the overlapping regions 21 are relatively small in area, the winding 20 can produce magnetic fields efficiently. As adjacent ones of the strand bundle segments 17a are inclined to each other by the angle $\theta_{43}$, the magnetic field produced by the winding 20 and the magnetic field produced by the magnet of an electric motor are oriented in different directions with a suitable angle therebetween, resulting in a skew effect for smooth motor rotation.

Figure 10:
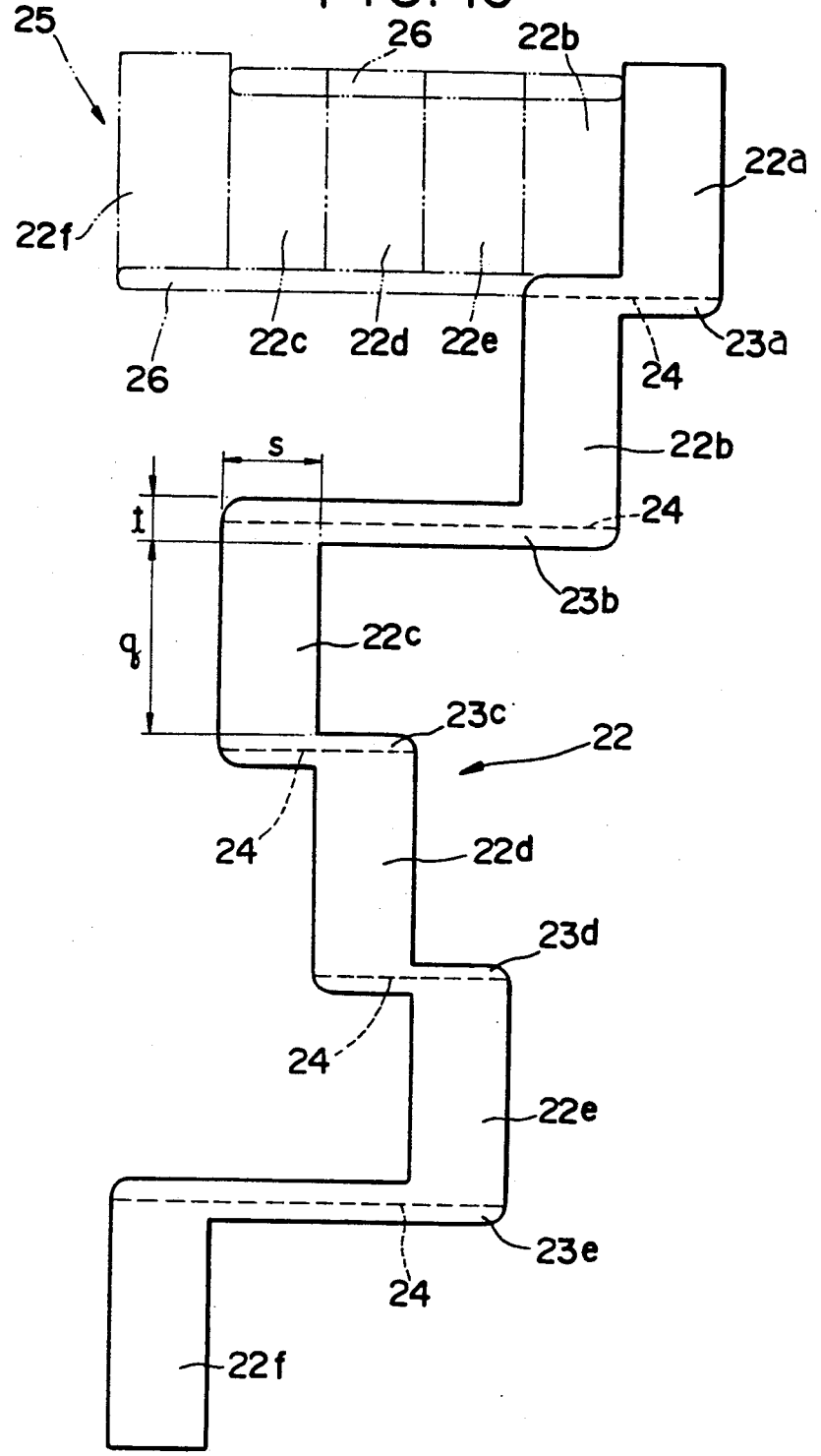
FIG. 10 is a plan view of a winding, shown unfolded, according to a fourth embodiment of the present invention.

FIG. 10 shows a winding according to a fourth embodiment of the present invention.

As shown in FIG. 10, a unitary web-shaped strand bundle 22 composed of a plurality of parallel strands has five longitudinally spaced bends 23a, 23b, 23c, 23d, 23e which divide the strand bundle 22 into a plurality of strand bundle segments 22a, 22b, 22c, 22d, 22e, 22f. Adjacent two of the strand bundle segments 22a, 22b, 22c, 22d, 22e, 22f are positioned one on each side of one of the bends 23a, 23b, 23c, 23d, 23e. The strand bundle segments 22a, 22b, 22c, 22d, 22e, 22f are staggered transversely of the strand bundle 22, and extend parallel to each other. The strand bundle segments 22b, 22c, 22d, 22e between the bends 23a~23e have equal lengths q, and the bends 23a~23e have equal lengths t in the longitudinal direction of the strand bundle 22.

The strand bundle segments 22b, 22d, 22f joined to odd-numbered bends 23a, 23c, 23e as counted from a reference strand bundle segment 22a on one end of the strand bundle 22 are transversely staggered from the reference strand bundle segment 22a by respective distances that are multiples of the width s of the strand bundle 22 by odd numbers. The strand bundle segments 22c, 22e joined to even-numbered bends 23b, 23d as counted from the reference strand bundle segment 22a are transversely staggered from the reference strand bundle segment 22a by respective distances that are multiples of the width s of the strand bundle 22 by even numbers. More specifically, the first, third, and fifth strand bundle segments 22b, 22d, 22f from the reference strand bundle segment 22a are transversely staggered from the reference strand bundle segment 22a by one, three, and five times the width s of the strand bundle 22, and the second and fourth strand bundle segments 22c, 22e from the reference strand bundle segment 22a are transversely staggered from the reference strand bundle segment 22a by two and four times the width s of the strand bundle 22. The strand bundle segments 22b through 22f can thus be transversely staggered from the reference strand bundle segments 22a by suitably adjusting the lengths and directions of the bends 23a~23e in the transverse direction of the strand bundle 22.

The strand bundle 22 has a plurality of fold lines 24 extending perpendicularly to the longitudinal direction thereof and lying centrally across the respective bends 23a~23e.

The strand bundle 22 is folded over on itself successively along the fold lines 24, thus forming a plate-like winding 25 as indicated by the imaginary lines in FIG. 10. The strand bundle segments 22a through 22f lie parallel to each other in the winding 25. The folded strand bundle 22 overlaps itself only in overlapping regions 26 at the respective bends 23a~23e. The overlapping regions 26 are smaller in area than the overlapping regions of the conventional helical winding shown in FIG. 22. Consequently, the amount of material of the winding 25 is reduced, and so is the electric resistance of the winding 25 to electric currents flowing therethrough. The winding 25 is also reduced in thickness and hence weight. The winding 25 can produce uniform magnetic fields efficiently for rotating an electric motor.

Figure 11:
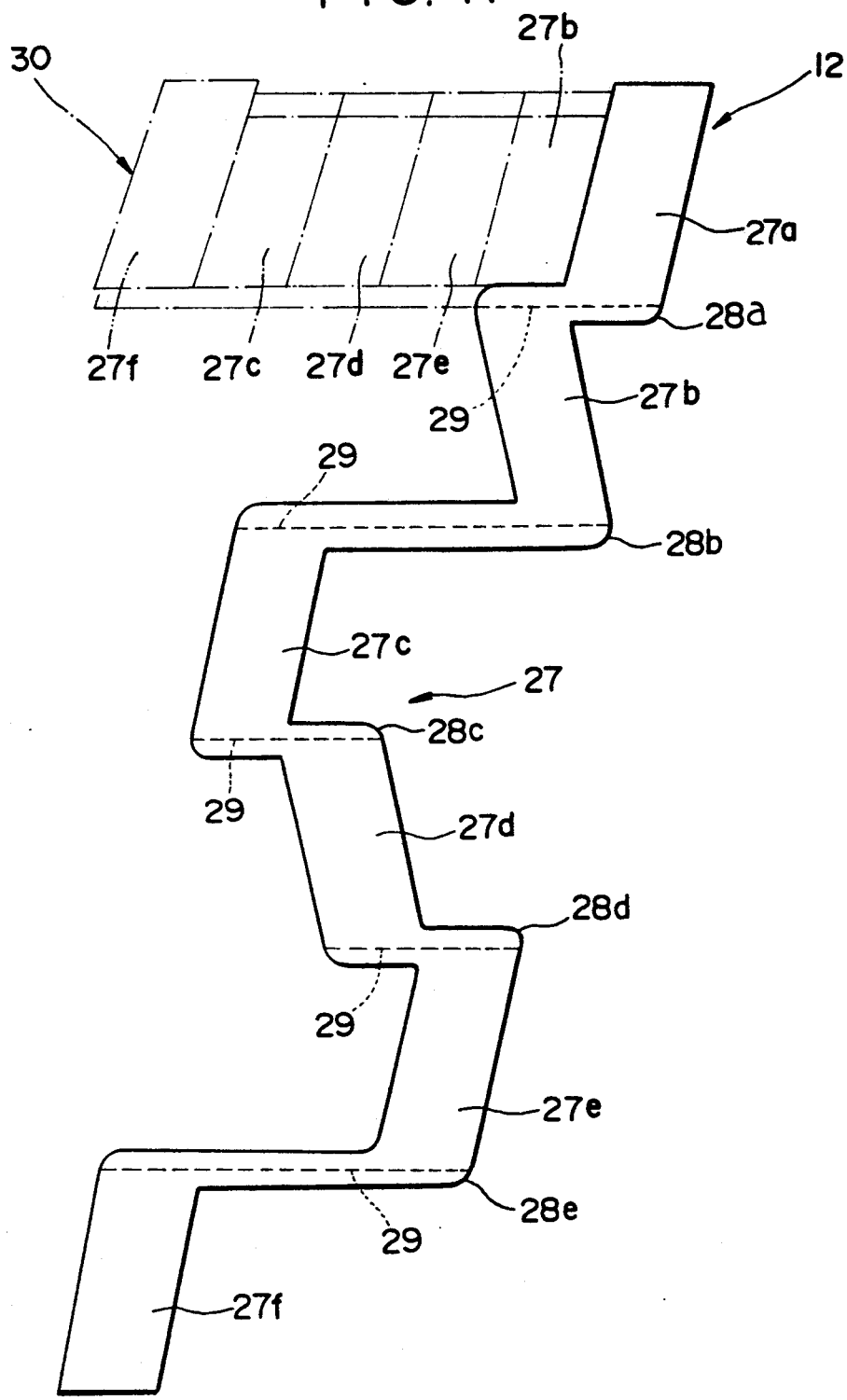
FIG. 11 is a plan view of a winding, shown unfolded, according to a fifth embodiment of the present invention.

FIG. 11 shows a winding according to a fifth embodiment of the present invention.

In FIG. 11, a strand bundle 27 has a plurality of bends 28a~28e and a plurality of strand bundle segments 27a~27f similar to those of the strand bundle 22 shown in FIG. 10, and the strand bundle segments 27a~27f are inclined similarly to those of the strand bundle 12 shown in FIG. 8.

More specifically, odd-numbered strand bundle segments 27b, 27d, 27f as counted from a reference strand bundle segment 27a on one end of the strand bundle 27 are substantially transversely staggered from the reference strand bundle segment 27a by respective distances that are multiples of the width of the strand bundle 27 by odd numbers, and are oriented parallel to each other. Even-numbered strand bundle segments 27c, 27e are substantially transversely staggered from the reference strand bundle segment 27a by respective distances that are multiples of the width of the strand bundle 27 by even numbers, and are oriented parallel to each other and obliquely to the odd-numbered strand bundle segments 27b, 27d, 27f. The strand bundle 27 has a plurality of fold lines 29 extending transversely thereof centrally across the respective bends 28a~28e. When the strand bundle 27 is folded over on itself successively along the fold lines 29, a plate-like winding 30 is produced which is of the same shape as the winding 15 shown in FIG. 8. The winding 30 is also effective to produce uniform magnetic fields efficiently for rotating an electric motor.

A winding according to a sixth embodiment of the present invention, and a process of manufacturing the winding according to the sixth embodiment will be described below with reference to FIGS. 12 through 15.

Figure 12:
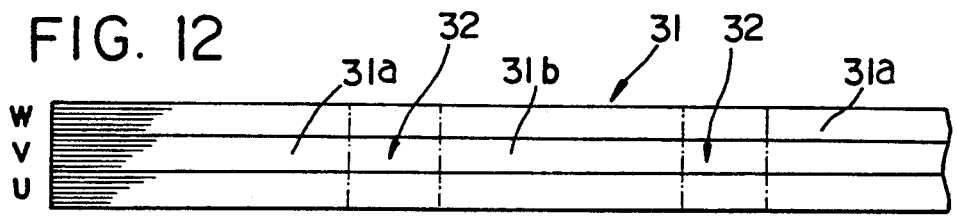
FIGS. 12, 13, 14, and 15 are views showing a process of manufacturing a winding according to a sixth embodiment of the present invention.

As shown in FIG. 12, a flat web-shaped strand bundle 31 comprises three parallel strand bundles assigned respectively to U-, V-, and W-phases and each composed of enameled wires. The strand bundles are bonded to each other except for longitudinally spaced regions 32 where the strand bundles or enameled wires are separate from each other. The strand bundle 31 therefore includes a plurality of strand bundle segments 31a, 31b divided by the regions 32 where the strand bundles are bonded together.

Figure 13:
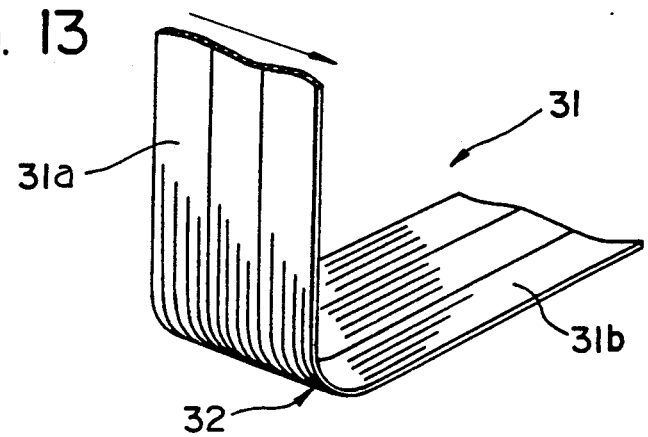
Figure 14:
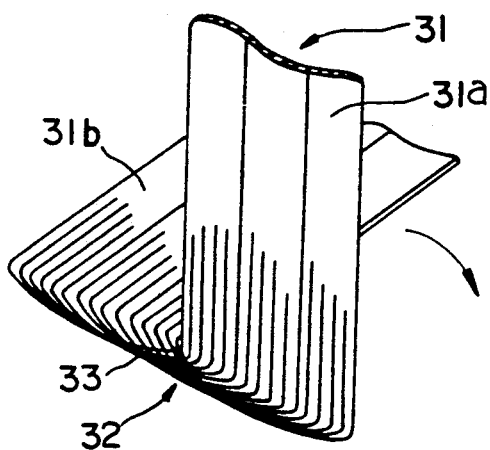
Figure 15:
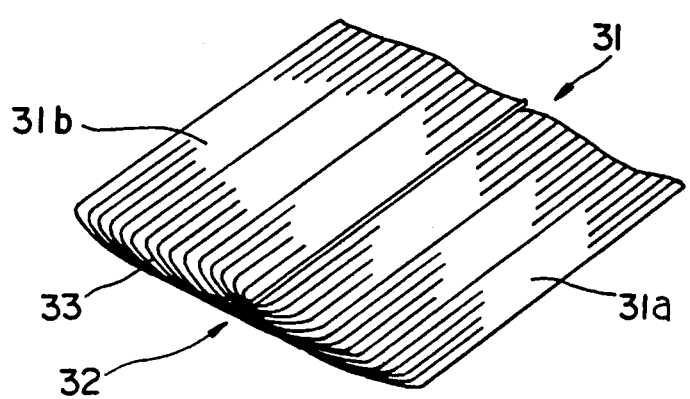

As shown in FIG. 13, one bonded strand bundle segment 31a is turned upwardly about an adjacent region 32 with respect to an adjacent bonded strand bundle segment 31b. Then, as indicated by the arrow in FIG. 13, the erected strand bundle segment 31a is horizontally displaced in the transverse direction of the strand bundle segment 31b until the strand bundle segment 31a is transversely shifted as shown in FIG. 14. Such transverse displacement of the strand bundle segment 31a is allowed by the region 32 because the enameled wires are not bonded in the region 32. At this time, as shown in FIG. 14, the enameled wires in the region 32 cross each other, forming a bend 33. The strand bundle segment 31a is transversely displaced over an interval which is the same as the width of the strand bundle 31. Then, as indicated by the arrow in FIG. 14, the transversely displaced strand bundle segment 31a is turned downwardly about the region 32 into a position adjacent to the strand bundle segment 31b. Now, the strand bundle segments 31a, 31b are juxtaposed parallel to each other as shown in FIG. 15. The above process is repeated to fold over the strand bundle 31 successively, forming a flat plate-like winding which is of essentially the same shape as the winding 4 according to the first embodiment. The winding thus formed has overlapping regions which are very small in area. The winding is small in size and can be manufactured with ease. The winding according to the sixth embodiment is also effective to produce uniform magnetic fields efficiently for rotating an electric motor.

A winding according to a seventh embodiment of the present invention, and a process of manufacturing the winding according to the seventh embodiment will be described below with reference to FIGS. 16 through 19.

Figure 16:
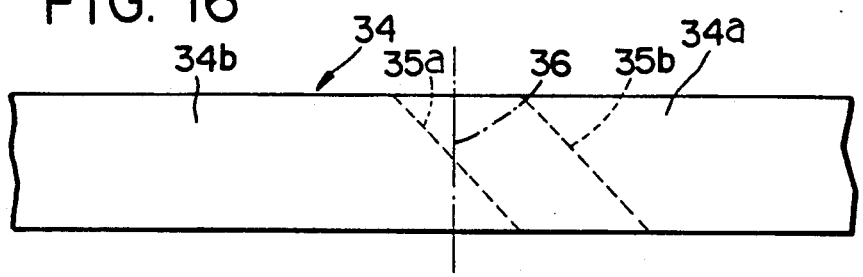
FIGS. 16, 17, 18, and 19 are views showing a process of manufacturing a winding according to a seventh embodiment of the present invention.

As shown in FIG. 16, a flat web-shaped strand bundle 34 comprises three parallel strand bundles assigned respectively to U-, V-, and W-phases and each composed of enameled wires. The strand bundle 34 has a pair of fold lines 35a, 35b for forming a bend which will be described later on. The strand bundle 34 also has strand bundle segments 34a, 34b disposed one on each side of the pair of fold lines 35a, 35b. The fold lines 35a, 35b extend parallel to each other and are inclined at 45° to the longitudinal direction of the strand bundle 34. The fold lines 35a, 35b are spaced from each other by a distance which is the same as the width of the strand bundle 34, in the longitudinal direction of the strand bundle 34.

Figure 17:
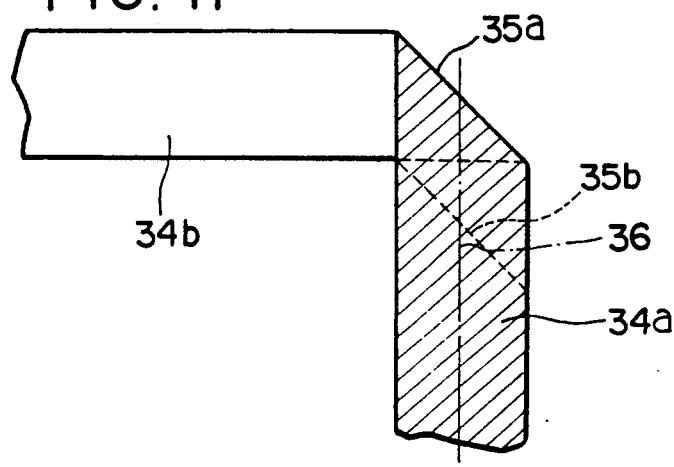

As shown in FIG. 17, the strand bundle segment 34a is folded over along the fold line 35a in the direction of a fold line 36 that extend centrally across the fold line 35a in the transverse direction of the strand bundle 34, thus overlapping the strand bundle 35b. At this time, half of the area between the fold lines 35a, 35b is superimposed on the surface of the strand bundle 35b, and hence the fold line 35b is positioned outside of the overlapping region. The reverse side of the strand bundle 34 is shown hatched in FIG. 17.

Figure 18:
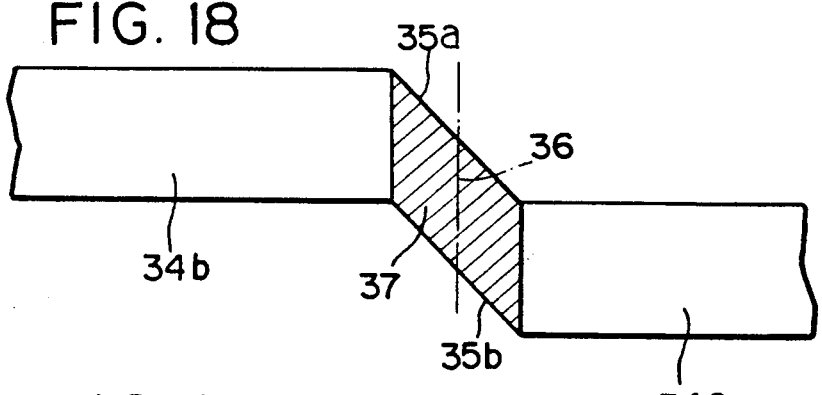

Then, as shown in FIG. 18, the folded strand bundle segment 34a is further folded over along the fold line 35b in the longitudinal direction of the strand bundle 34. The strand bundle segments 34a, 34b are therefore displaced a distance equal to the width of the strand bundle 34 in the transverse direction of the strand bundle 34, with a bend 37 formed therebetween. The bend 37 is constituted by the area between the fold lines 35a, 35b, only shown upside down.

Figure 19:
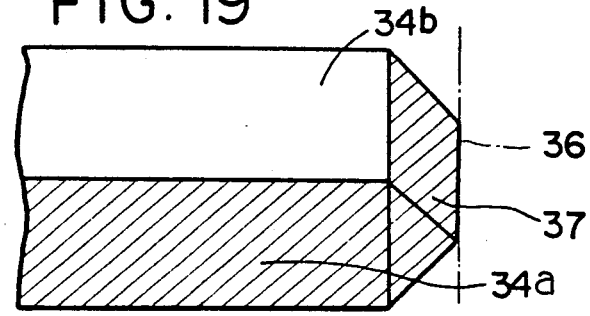

Thereafter, as shown in FIG. 19, the strand bundle 34a is folded over along the fold line 36 into a position adjacent to the strand bundle 34b. the strand bundles 34a, 34b now being positioned parallel to each other. The above process is repeated to fold over the strand bundle 34 successively along the fold lines 36, forming a flat plate-like winding which is of essentially the same shape as the winding 4 according to the first embodiment. The winding thus formed has overlapping regions which are very small in area, and can be manufactured with ease. The winding according to the seventh embodiment is also effective to produce uniform magnetic fields efficiently for rotating an electric motor.

The angle at which the fold lines 35a, 35b are inclined in the longitudinal direction of the strand bundle 34 and the distance by which the fold lines 35a, 35b are spaced from each other may be suitably selected to form windings which are similar to the windings according to the second through fifth embodiments described above.

A winding according to an eighth embodiment of the present invention will be described with reference to FIGS. 20 and 21.

Figure 20:
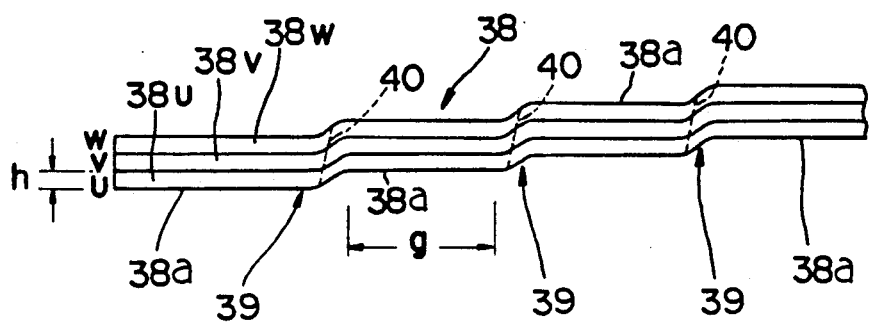
FIG. 20 is a fragmentary plan view of a winding, shown unfolded, according to an eighth embodiment of the present invention.

As shown in FIG. 20, a unitary strand bundle 38 is composed of three parallel web-shaped strand bundles $38_u$, $38_v$, $38_w$ each comprising a plurality of parallel strands, the strand bundles $38_u$, $38_v$, $38_w$ being allotted respectively to U-, V-, and W-phase currents. The unitary strand bundle 38 includes a plurality of bends 39 longitudinally spaced at predetermined intervals g. The unitary strand bundle 38 is divided into a plurality of straight strand bundle segments 38a by the bends 39, each bend 38 being disposed between two of the strand bundle segments 38a. The strand bundle segments 38a are successively staggered transversely on one side of the strand bundle 38 from one end to the other of the strand bundle 38, and extend parallel to each other.

Any adjacent two of the strand bundle segments 38a are transversely staggered relatively to each other by an interval that is the same as the width h of the strand bundle $38_u$, for example. The strand bundle 38 has a plurality of fold lines 40 extending across the respective bends 39 and inclined at a certain angle to the transverse direction of the strand bundle 38. The bends 39 have equal lengths in the longitudinal direction of the strand bundle 38.

Figure 21:
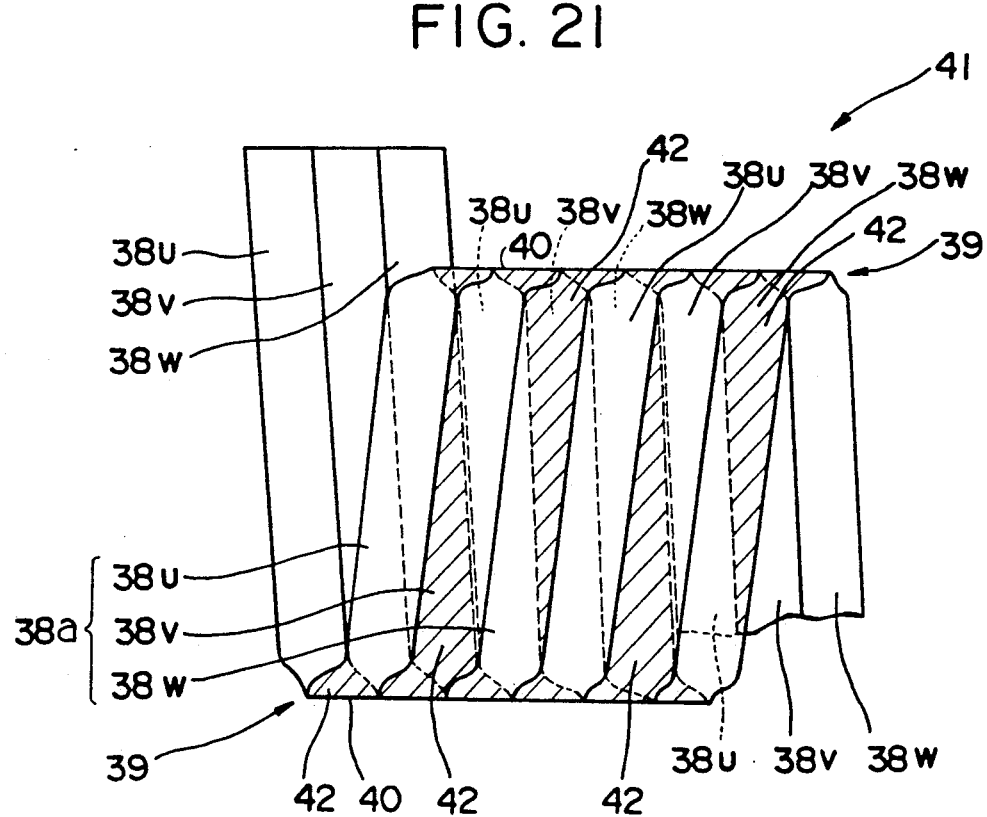
FIG. 21 is an enlarged fragmentary plan view of the winding according to the eighth embodiment.

The strand bundle 38 thus staggered is then folded over on itself successively along the fold lines 40 so that the strand bundle segments 38a overlap for the distances g, jointly making up a flat plate-shaped winding 41 as shown in FIG. 21. The winding 41 is of an elongate shape extending transversely of the strand bundles $38_u$, $38_v$, $38_w$, which remain unchanged in the order in which they are arranged in the winding 41. The strand bundle segments 38a are inclined to each other at an angle which is equal to the angle at which the fold lines 40 are inclined. The folded strand bundle 38 overlaps itself in overlapping regions 42, shown hatched, in the bends 40 where electric currents flow in opposite directions. Since the strand bundle segments 38a are transversely displaced from each other, the overlapping regions 42 are smaller in area than the overlapping regions of the conventional helical winding shown in FIG. 22. Any canceling out of produced magnetic fields caused by the overlapping regions of the strand bundle 38 is therefore relatively small. The strand bundle 38 can efficiently produce magnetic fields that are required to rotate an electric motor. As the magnetic field produced by the strand bundle segments 38a and the magnetic field produced by the magnet of an electric motor are oriented in different directions with a suitable angle therebetween, the winding 41 provides a skew effect for smooth motor rotation. The winding 41 as it is assembled in an electric motor allows the motor to rotate smoothly with a reduced torque loss.

The winding according to any of the above embodiments of the present invention can easily be manufactured simply by folding the strand bundle successively along the fold lines. As the overlapping regions of the strand bundle where electric currents flow in opposite directions are relatively small in area, the winding enables the electric motor to produce a desired torque efficiently. The relatively small area of the overlapping regions of the strand bundle allows the winding to be reduced in thickness and weight, and also to have a low electric resistance for efficient generation of a desired motor torque. Since the winding has a reduced thickness, the distance between the core and the magnet of the electric motor which incorporates the winding is made relatively small. As a result, the flux density between the core and the magnet is increased for efficient motor torque generation.

Since the strand bundle is folded over on itself along the fold lines across the bends, the strand bundle segments of the folded strand bundle, and hence the directions in which electric currents flow through the strand bundle are substantially parallel to the rotatable shaft of the electric motor. Therefore, the direction of the magnetic field produced by the winding and the direction of the magnetic field produced by the magnet of the motor are substantially the same as each other for generating electromagnetic forces highly efficiently.

The direction of the magnetic field produced by the winding and the direction of the magnetic field produced by the magnet of the motor may be determined as desired depending on the angle of the fold lines. Thus, the winding is effective to both generate a motor torque efficiently and cause the motor to rotate smoothly.

The winding according to the present invention can easily be manufactured, allows an electric motor to produce a desired torque when incorporated in the motor, and makes the electric motor light in weight and small in size.

While the present invention has been described above with respect to windings for the passage of three-phase currents, the principles of the present invention are also applicable to windings for the passage of a single-phase current or a polyphase current.

Although certain preferred embodiments of the present invention have been shown and described in detail, it should be understood that various changes and modifications may be made therein without departing from the scope of the appended claims.

What is claimed is:

1. An armature winding structure for use in an electric motor, comprising:
a web-shaped strand bundle composed of a plurality of parallel strands, said strand bundle having a plurality of longitudinally spaced bends and a plurality of straight strand bundle segments, adjacent ones of said strand bundle segments being positioned one on each side of one of said bends, said strand bundle segments being transversely staggered on one side of said strand bundle successively from one end to the other of the strand bundle, by intervals each substantially equal to a width of said strand bundle, said strand bundle being longitudinally folded over along fold lines extending respectively across said strand bundle proximate said bends and transversely of said strand bundle, wherein said fold lines extend substantially perpendicularly to a longitudinal direction of said strand bundle, thereby providing a plate-like winding in which said strand bundle segments lie parallel and adjacent to one another.

2. The armature winding structure according to claim 1, wherein said strand bundle segments extend parallel to each other before said strand bundle is folded over.

3. The armature winding structure according to claim 2, wherein each of said bends has a pair of opposite arcuate edges extending along respective arcs of a pair of quadrants whose radii correspond to the width of said strand bundle and whose centers are spaced from each other by the width of said strand bundle.

4. The armature winding structure according to claim 2, wherein said fold lines extend substantially perpendicularly to a longitudinal direction of said strand bundle.

5. The armature winding structure according to claim 1, wherein said fold lines are positioned centrally in said bends, respectively, in the longitudinal direction of said strand bundle.

6. The armature winding structure according to claim 5, wherein said bends have equal lengths in the longitudinal direction of said strand bundle, and said strand bundle segments between said bends have equal lengths in the longitudinal direction of said strand bundle.

7. The armature winding structure according to claim 1, wherein the strand bundle which is longitudinally folded over has portions extending between said fold lines, said portions having equal lengths.

8. The armature winding structure according to claim 1, wherein the strand bundle which is longitudinally folded over has overlapping regions near the fold lines, respectively, said overlapping regions being positioned axially outwardly of a core of an armature of the electric motor which incorporates said winding.

9. The armature winding structure according to claim 1, wherein the strand bundle which is longitudinally folded over has portions extending between said fold lines, said portions having lengths equal to a length of a core of an armature of the electric motor, said electric motor incorporating said winding.

10. The armature winding structure according to claim 1, wherein the strand bundle which is longitudinally folded over has portions extending between said fold lines, said portions having lengths equal to a length of a magnet of a rotor of the electric motor, said electric motor incorporating said winding, said magnet confronting said strand bundle.

11. The armature winding structure according to claim 1, wherein each of said bends is formed when the strand bundle segments positioned one on each side thereof are displaced relatively to each other in substantially transverse opposite directions, respectively.

* * * * *